US012618376B2

(12) United States Patent　(10) Patent No.:　US 12,618,376 B2

Feulner et al.　(45) Date of Patent:　May 5, 2026

(54) BLEEDING CORE AIR FROM A TURBINE ENGINE CORE FLOWPATH

(71) Applicant: RTX Corporation, Farmington, CT (US)

(72) Inventors: Matthew R. Feulner, East Hampton, CT (US); Daniel B. Kupratis, Wallingford, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/802,477

(22) Filed: Aug. 13, 2024

(65) Prior Publication Data

US 2026/0049579 A1　Feb. 19, 2026

(51) Int. Cl.
F02C 9/18　(2006.01)
F04D 27/00　(2006.01)

(52) U.S. Cl.
CPC .............. F02C 9/18 (2013.01); F04D 27/009 (2013.01)

(58) Field of Classification Search
CPC .......... F04D 27/009; F02C 6/08; F02C 7/052; F02C 9/18; F02C 7/05
See application file for complete search history.

(56) References Cited

U.S. PATENT DOCUMENTS

| | | | |
|---|---|---|---|
| 5,123,240 A | 6/1992 | Frost | |
| 6,499,285 B1 | 12/2002 | Snyder | |
| 9,046,056 B2 | 6/2015 | Lerg | |
| 9,518,513 B2 | 12/2016 | Pritchard, Jr. | |
| 9,909,497 B2 | 3/2018 | Feulner | |
| 10,144,519 B2 | 12/2018 | Schwarz | |
| 10,287,992 B2 | 5/2019 | Tan | |
| 11,753,965 B1 * | 9/2023 | Ganji | F01D 25/24 60/785 |
| 12,241,411 B1 * | 3/2025 | Lutjen | F01D 5/087 |
| 2008/0063515 A1 | 3/2008 | Bil | |
| 2014/0109589 A1 * | 4/2014 | Pritchard, Jr. | F02C 6/08 60/785 |
| 2016/0123235 A1 | 5/2016 | Siering | |
| 2016/0265442 A1 | 9/2016 | Beecroft | |
| 2017/0058783 A1 * | 3/2017 | Tan | F02C 9/18 |
| 2022/0252008 A1 | 8/2022 | Sibbach | |

FOREIGN PATENT DOCUMENTS

FR　　3065030 B1　　1/2021

OTHER PUBLICATIONS

EP Search Report for EP Patent Application No. 25195695.9 dated Jan. 9, 2026.

* cited by examiner

*Primary Examiner* — Rodolphe Andre Chabreyrie
(74) *Attorney, Agent, or Firm* — Getz Balich LLC

(57)　　　　　ABSTRACT

A bleed system for a turbine engine includes a bleed port, an inlet passage, an outlet passage, a cavity and a flow diverter. The bleed port is disposed longitudinally along a core flowpath between an inlet into the core flowpath and an exhaust from the core flowpath. The bleed port fluidly couples the core flowpath to the inlet passage. The flow diverter is configured to move between a first position and a second position. When the flow diverter is in the first position, the flow diverter fluidly decouples the inlet passage from the outlet passage, and the cavity is fluidly coupled with the inlet passage and is downstream of the flow diverter. When the flow diverter is in the second position, the flow diverter fluidly couples the inlet passage to the outlet passage.

18 Claims, 8 Drawing Sheets

BLEEDING CORE AIR FROM A TURBINE ENGINE CORE FLOWPATH

BACKGROUND OF THE DISCLOSURE

1. Technical Field

This disclosure relates generally to an aircraft and, more particularly, to bleeding air from a flowpath of an aircraft engine.

2. Background Information

Various systems and methods are known in the art for bleeding air from a flowpath of an aircraft engine. While these known systems and methods have various benefits, there is still room in the art for improvement.

SUMMARY OF THE DISCLOSURE

According to an aspect of the present disclosure, an assembly is provided for a turbine engine. This assembly includes an engine core and a bleed system. The engine core includes a core flowpath, a compressor section, a combustor section and a turbine section. The core flowpath extends through the compressor section, the combustor section and the turbine section from an inlet into the core flowpath to an exhaust from the core flowpath. The bleed system includes a bleed port, an inlet passage, an outlet passage, a cavity and a flow diverter. The bleed port is disposed longitudinally along the core flowpath between the inlet into the core flowpath and the exhaust from the core flowpath. The bleed port fluidly couples the core flowpath to the inlet passage. The flow diverter is configured to move between a first position and a second position. When the flow diverter is in the first position, the flow diverter fluidly decouples the inlet passage from the outlet passage, and the cavity is fluidly coupled with the inlet passage and is downstream of the flow diverter. When the flow diverter is in the second position, the flow diverter fluidly couples the inlet passage to the outlet passage.

According to another aspect of the present disclosure, another assembly is provided for a turbine engine. This assembly includes an engine core and a bleed system. The engine core includes a core flowpath, a compressor section, a combustor section and a turbine section. The core flowpath extends through the compressor section, the combustor section and the turbine section from an inlet into the core flowpath to an exhaust from the core flowpath. The bleed system includes a bleed port, an inlet passage, an outlet passage, a cavity and a flow diverter. The bleed port is disposed longitudinally along the core flowpath between the inlet into the core flowpath and the exhaust from the core flowpath. The bleed port fluidly couples the core flowpath to the inlet passage. The flow diverter is configured to move between a first position and a second position. When the flow diverter is in the first position, the flow diverter fluidly decouples the inlet passage from the outlet passage, the cavity is fluidly coupled with the inlet passage through a cavity inlet, and the flow diverter at least partially forms the cavity inlet. When the flow diverter is in the second position, the flow diverter fluidly couples the inlet passage to the outlet passage.

According to still another aspect of the present disclosure, another assembly is provided for a turbine engine. This assembly includes an engine core and a bleed system. The engine core includes a core flowpath, a compressor section, a combustor section and a turbine section. The core flowpath extends through the compressor section, the combustor section and the turbine section from an inlet into the core flowpath to an exhaust from the core flowpath. The bleed system includes a bleed port, an inlet passage, a first outlet passage, a second outlet passage, a cavity and a flow diverter. The bleed port is disposed longitudinally along the core flowpath. The bleed port fluidly couples the core flowpath to the inlet passage. The flow diverter is configured to move between a first position and a second position. When the flow diverter is in the first position, the flow diverter fluidly decouples the inlet passage from the first outlet passage and fluidly couples the inlet passage to the cavity. When the flow diverter is in the second position, the flow diverter fluidly couples the inlet passage to the first outlet passage and fluidly decouples the inlet passage from the cavity. When the flow diverter is in a third position between the first position and the second position, the flow diverter fluidly couples the inlet passage to the first outlet passage and the cavity, and the flow diverter fluidly couples the cavity to the second outlet passage.

The bleed port may be disposed longitudinally along the core flowpath downstream of the compressor section.

The bleed port may be disposed longitudinally along the core flowpath downstream within the compressor section.

When the flow diverter is in the second position, the cavity may be fluidly coupled to at least one of the inlet passage and the outlet passage.

When the flow diverter is in the second position, the flow diverter may fluidly decouple the cavity from the inlet passage.

The bleed system may be configured to direct debris traveling within the core flowpath through the bleed port and into the inlet passage. The flow diverter may be configured to direct the debris from the inlet passage into the cavity when the flow diverter is in the first position.

The bleed system may also be configured to direct the debris from the inlet passage into the outlet passage when the flow diverter is in the second position.

When the flow diverter is in the second position, the bleed system may also be configured to direct the debris out of the engine core through the outlet passage.

The turbine engine may be configured as or otherwise include a turbofan engine. The assembly may also include a bypass flowpath outside of the engine core. The outlet passage may be configured to fluidly couple the inlet passage to the bypass flowpath when the flow diverter is in the second position.

The flow diverter may at least partially form an inlet into the cavity when the flow diverter is in the first position.

The engine core may extend along an axis. The flow diverter may be configured to move axially along the axis between the first position and the second position.

The cavity may be a blind cavity.

The bleed system may also include a second outlet passage. When the flow diverter is in a third position, the flow diverter may fluidly couple the inlet passage to the cavity and fluidly couple the cavity to the second outlet passage.

When the flow diverter is in a third position, the flow diverter may fluidly couple the inlet passage to the outlet passage.

When the flow diverter is in the first position, the flow diverter may fluidly decouple the cavity from the second outlet passage.

When the flow diverter is in the second position, the flow diverter may fluidly decouple the cavity from the second outlet passage.

The engine core may extend along an axis. The cavity may be located axially between the inlet into the core flowpath and the inlet passage.

The engine core may extend along an axis. The inlet passage may be located axially between the inlet into the core flowpath and the cavity.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
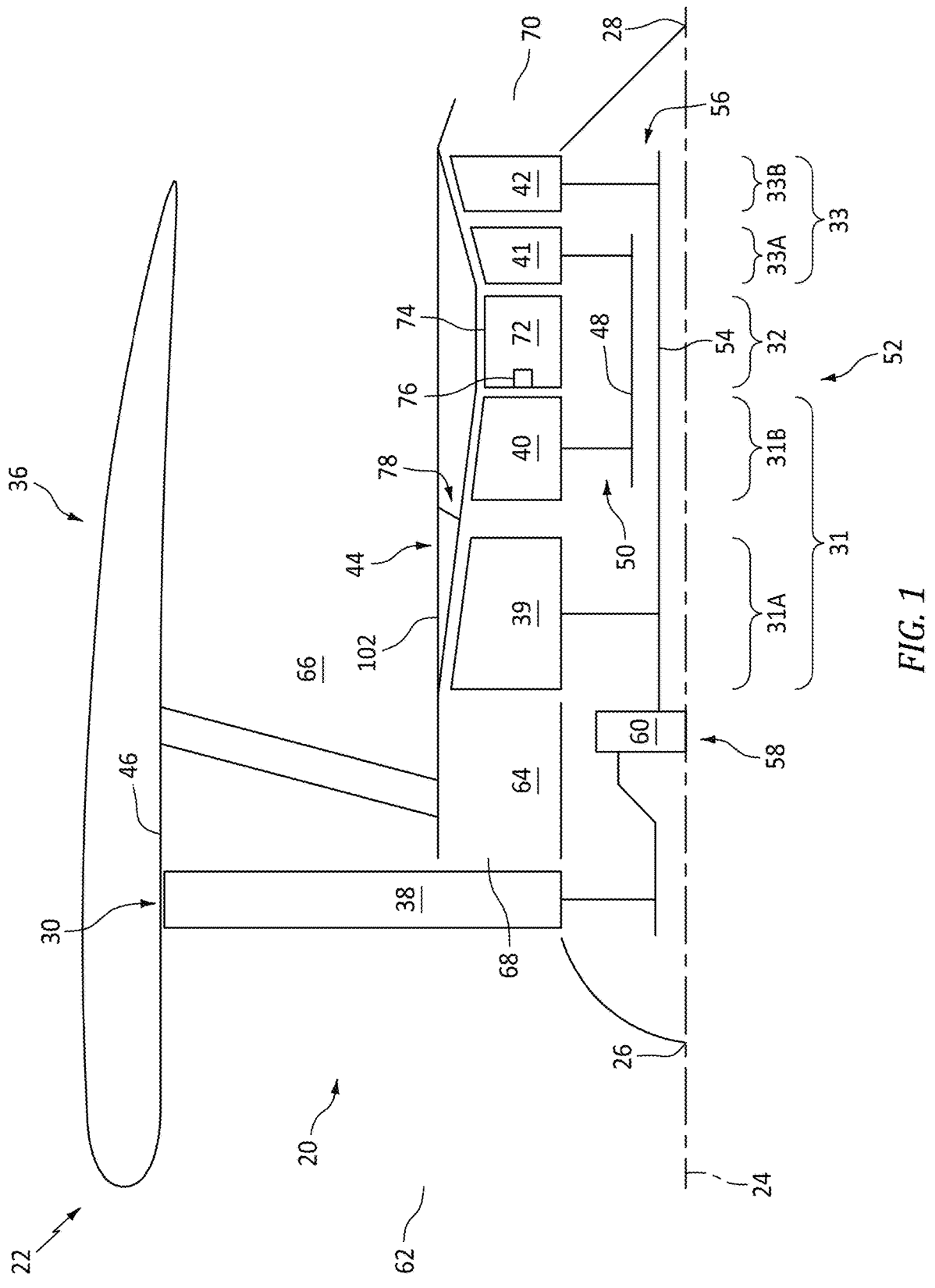
FIG. 1 is a partial schematic sectional illustration of an aircraft propulsion system.

FIG. 1 illustrates a gas turbine engine 20 for a propulsion system 22 for an aircraft. The aircraft may be an airplane, a drone (e.g., an unmanned aerial vehicle (UAV)), or any other manned or unmanned aerial vehicle or system. For ease of description, the aircraft propulsion system 22 is described below as a ducted propulsor propulsion system such as a turbofan propulsion system, and the turbine engine 20 is described below as a turbofan engine. The present disclosure, however, is not limited to such an exemplary aircraft propulsion system nor such an exemplary turbine engine. The aircraft propulsion system 22, for example, may alternatively be configured as a turbojet propulsion system, a turboprop propulsion system, a turboshaft propulsion system or an open rotor propulsion system. Moreover, the present disclosure is not limited to propulsion system applications. The turbine engine 20, for example, may alternatively be configured as or included as part of an auxiliary power unit (APU) for the aircraft or a ground-based (e.g., industrial) electrical power system.

The turbine engine 20 of FIG. 1 extends axially along an axis 24 between a forward, upstream end 26 of the turbine engine 20 and an aft, downstream end 28 of the turbine engine 20. Briefly, the axis 24 may be a centerline axis of the turbine engine 20 and/or one or more of its members. The axis 24 also may or alternatively be a rotational axis for one or more members of the turbine engine 20. The turbine engine 20 of FIG. 1 includes a propulsor section 30 (e.g., a fan section), a compressor section 31, a combustor section 32 and a turbine section 33. The compressor section 31 of FIG. 1 includes a low pressure compressor (LPC) section 31A and a high pressure compressor (HPC) section 31B. The turbine section 33 of FIG. 1 includes a high pressure turbine (HPT) section 33A and a low pressure turbine (LPT) section 33B.

The engine sections 30-33B may be arranged sequentially along the axis 24 within a stationary engine housing 36. The propulsor section 30 includes a bladed propulsor rotor 38; e.g., a fan rotor. The LPC section 31A includes a bladed low pressure compressor (LPC) rotor 39. The HPC section 31B includes a bladed high pressure compressor (HPC) rotor 40. The HPT section 33A includes a bladed high pressure turbine (HPT) rotor 41. The LPT section 33B includes a bladed low pressure turbine (LPT) rotor 42. The engine rotors 38-42 of FIG. 1 are housed within the engine housing 36; e.g., a nacelle and case structure. The engine housing 36 of FIG. 1, for example, includes an inner housing structure 44 (e.g., a core case structure) and an outer housing structure 46 (e.g., a propulsor case structure). The inner housing structure 44 may house one or more of the engine sections 31A-33B and their engine rotors 39-42. The outer housing structure 46 may house at least the propulsor section 30 and its propulsor rotor 38.

The HPC rotor 40 is coupled to and rotatable with the HPT rotor 41. The HPC rotor 40 of FIG. 1, for example, is connected to the HPT rotor 41 through a high speed shaft 48. At least (or only) the HPC rotor 40, the HPT rotor 41 and the high speed shaft 48 collectively form a high speed rotating assembly 50; e.g., a high speed spool of a core 52 of the turbine engine 20. This high speed rotating assembly 50 of FIG. 1 and its members 40, 41 and 48 are rotatable about the axis 24.

The LPC rotor 39 is coupled to and rotatable with the LPT rotor 42. The LPC rotor 39 of FIG. 1, for example, is connected to the LPT rotor 42 through a low speed shaft 54. At least (or only) the LPC rotor 39, the LPT rotor 42 and the low speed shaft 54 collectively form a low speed rotating assembly 56; e.g., a low speed spool of the engine core 52. This low speed rotating assembly 56 is further coupled to the propulsor rotor 38 through a drivetrain 58. This drivetrain 58 may be configured as a geared drivetrain, where a geartrain 60 (e.g., a transmission, a speed change device, an epicyclic geartrain, etc.) is disposed between and operatively couples the propulsor rotor 38 to the low speed rotating assembly 56 and its LPT rotor 42. With this arrangement, the propulsor rotor 38 may rotate at a different (e.g., slower) rotational speed than the low speed rotating assembly 56 and its LPT rotor 42. Here, the propulsor rotor 38 and the low speed rotating assembly 56 may rotate in a common (the same) direction about the axis 24 or in opposite directions about the axis 24 depending, for example, upon the specific configuration of the geartrain 60. However, the drivetrain 58 may alternatively be configured as a direct drive drivetrain, where the geartrain 60 is omitted. With such an arrangement, the propulsor rotor 38 rotates at a common (the same) rotational speed as the low speed rotating assembly 56 and its LPT rotor 42. The low speed rotating assembly 56 of FIG. 1 and its members 39, 42 and 54 as well as the propulsor rotor 38 are rotatable about the axis 24.

During operation, ambient air from outside of the aircraft enters the aircraft propulsion system 22 and its turbine engine 20 through an airflow inlet 62. This air is directed across the propulsor section 30 and into a (e.g., annular) core flowpath 64 and a (e.g., annular) bypass flowpath 66. The core flowpath 64 of FIG. 1 extends sequentially through the LPC section 31A, the HPC section 31B, the combustor section 32, the HPT section 33A and the LPT section 33B from an airflow inlet 68 into the core flowpath 64 to a combustion products exhaust 70 out from the core flowpath 64 and the engine core 52. The air entering the core flowpath 64 may be referred to as "core air". The bypass flowpath 66 extends through a bypass duct, which bypass flowpath 66 bypasses (e.g., is disposed radially outboard of and extends along) the engine core 52. The air within the bypass flowpath 66 may be referred to as "bypass air".

The core air is compressed by the LPC rotor 39 and the HPC rotor 40 and is directed into a (e.g., annular) combustion chamber 72 of a (e.g., annular) combustor 74 in the combustor section 32. Fuel is injected into the combustion chamber 72 by one or more fuel injectors 76 and mixed with the compressed core air to provide a fuel-air mixture. This fuel-air mixture is ignited and combustion products thereof flow through and sequentially drive rotation of the HPT rotor 41 and the LPT rotor 42 about the axis 24. The rotation of the HPT rotor 41 and the LPT rotor 42 respectively drive rotation of the HPC rotor 40 and the LPC rotor 39 about the axis 24 and, thus, compression of the air received from the core inlet 68. The rotation of the LPT rotor 42 also drives rotation of the propulsor rotor 38. The rotation of the propulsor rotor 38 propels the bypass air through and out of the bypass flowpath 66. The propulsion of the bypass air may account for a majority of thrust generated by the turbine engine 20 of FIG. 1, e.g., more than seventy-five percent (75%) of engine thrust. The turbine engine 20 of the present disclosure, however, is not limited to the foregoing exemplary thrust ratio.

Figure 2:
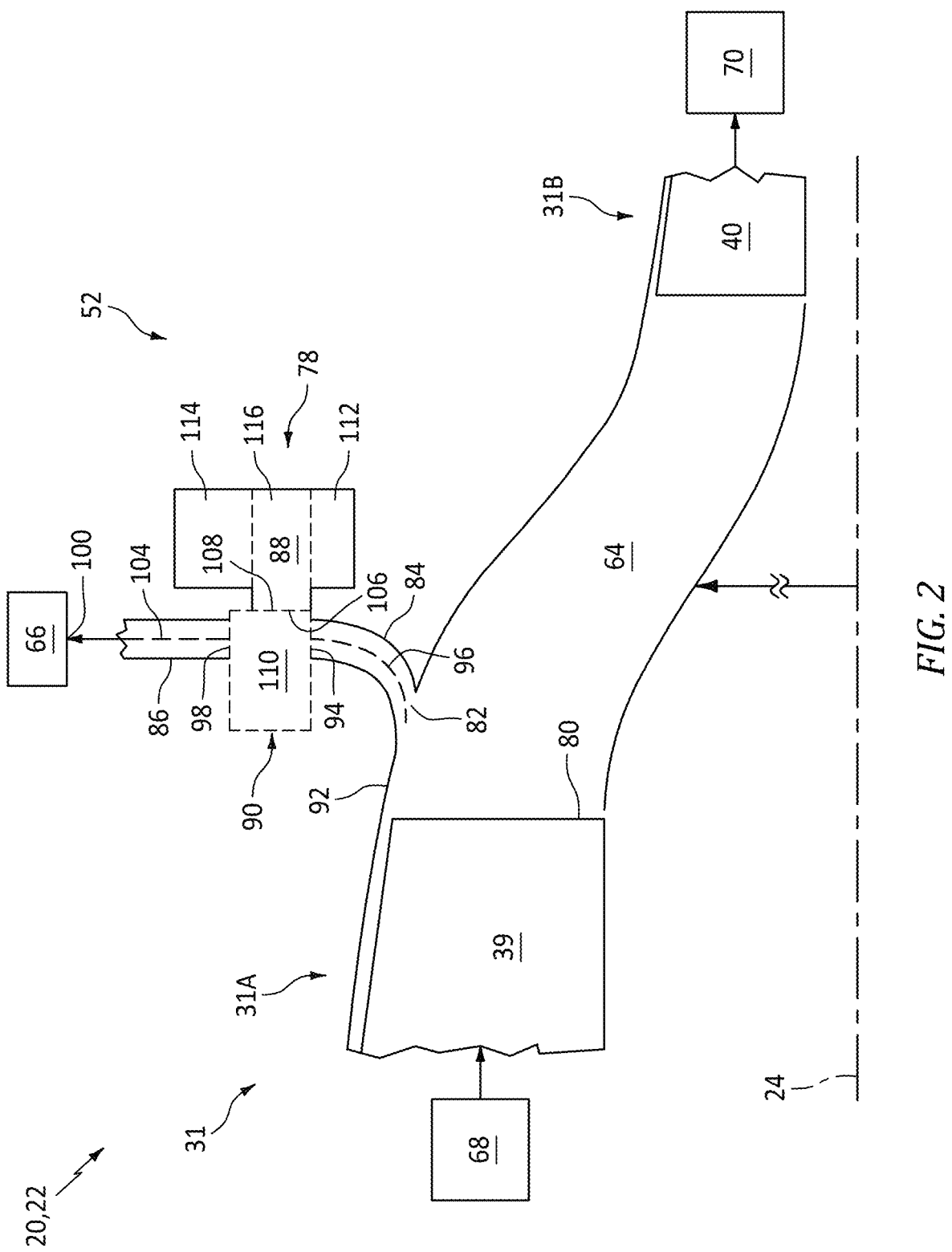
FIG. 2 is a partial schematic sectional illustration of the propulsion system at a bleed system along a flowpath.

Referring to FIG. 2, the turbine engine 20 includes a bleed system 78 configured to selectively bleed a quantity of the core air from the core flowpath 64. This bleed system 78 is also configured to remove debris from the core flowpath 64 along with or without the bled core air as described below in further detail. Examples of the debris include, but are not limited to, sand, dirt, ice, bird matter and/or other foreign matter ingested by the turbine engine 20. When present, this debris may be carried by/entrained in the core air flowing within the core flowpath 64.

For ease of description, the bleed system 78 is described below as bleeding the core air and/or removing the debris from a section of the core flowpath 64 within the compressor section 31. The bleed system 78 of FIG. 2, for example, is configured to bleed to the core air and/or remove the debris from a section of the core flowpath 64 at (e.g., on, adjacent or proximate) or near a downstream end 80 of the LPC section 31A. In particular, the bleed system 78 of FIG. 2 bleeds the core air and/or removes the debris from a section of the core flowpath 64 disposed longitudinally between the LPC rotor 39 and the HPC rotor 40 along the core flowpath 64. The present disclosure, however, is not limited to such an exemplary bleed/debris extraction location along the core flowpath 64. It is contemplated, for example, the bleed/debris extraction location may alternatively be upstream or downstream of the exemplary location shown in FIG. 2. Referring again to FIG. 2, the bleed system 78 includes a bleed port 82, an inlet passage 84, an outlet passage 86, a debris collection cavity 88 and a flow regulator 90.

The bleed port 82 is configured to fluidly couple the core flowpath 64 to the inlet passage 84. The bleed port 82, for example, may be formed as an opening in an outer flowpath wall 92 along the core flowpath 64. Here, the outer flowpath wall 92 forms a longitudinal section of an outer peripheral boundary of the core flowpath 64. The bleed port 82 may be disposed at or near the LPC rotor 39, and upstream of the HPC rotor 40 along the core flowpath 64. The bleed port 82 of FIG. 2, for example, is disposed at the downstream end 80 of the LPC rotor 39. Alternatively, it is contemplated the opening in the outer flowpath wall 92 forming the bleed port 82 may be disposed along the core flowpath 64 between upstream and downstream ends of LPC section 31A.

The inlet passage 84 projects longitudinally out from the bleed port 82 to an inlet 94 into the flow regulator 90. The inlet passage 84 thereby fluidly couples the bleed port 82 to the regulator inlet 94. The inlet passage 84 may follow a (e.g., curved) trajectory 96 which turns radially outward as the inlet passage 84 extends (a) longitudinally away from or about the bleed port 82 and (b) to or about the regulator inlet 94. For example, at the bleed port 82, the inlet passage 84 trajectory may be oriented to be within ten degrees (10°), twenty degrees (20°) or thirty degrees (30°) of parallel of the flowpath wall 92 at location of the bleed port 82. This arrangement may facilitate a relatively smooth transition of boundary layer airflow from the core flowpath 64 into the inlet passage 84 through the bleed port 82. The inlet passage trajectory 96 of FIG. 2, in particular, is angularly offset from the axis 24 by an offset angle at the bleed port 82. This offset angle may be a non-zero acute angle, for example, between twenty degrees (20°) and forty-five degrees (45°) or between forty-five degrees (45°) and seventy degrees (70°). However, in other embodiments, the offset angle may be smaller or larger depending on a trajectory (e.g., curvature) of the core flowpath 64 at the bleed port location. By contrast, at the regulator inlet 94 of FIG. 2, the inlet passage trajectory 96 may be angularly offset from the axis 24 by ninety degrees (90°), or close to (e.g., +/−5° or 10°) of ninety degrees (90°).

The outlet passage 86 projects longitudinally out from an outlet 98 from the flow regulator 90 to an outlet 100 from the outlet passage 86. The outlet passage outlet 100 may fluidly couple the outlet passage 86 to the bypass flowpath 66. The outlet passage outlet 100, for example, may be formed as an opening in an inner flowpath wall 102 along the bypass flowpath 66 (see FIG. 1). Alternatively, it is contemplated the outlet passage outlet 100 may fluidly couple the outlet passage 86 to another volume (e.g., flowpath, plenum, etc.) outside of the engine core 52, which other volume may be within the turbine engine 20 or outside of the turbine engine 20 and, more generally, the aircraft propulsion system 22. A trajectory 104 of the outlet passage 86, at least at the regulator outlet 98, may be substantially radial outward; e.g., with little or no axial component. The outlet passage trajectory 104 at the regulator outlet 98, for example, may be angularly offset from the axis 24 by ninety degrees (90°), or close to (e.g., +/−5° or 10°) of ninety degrees (90°).

An orifice 106 of the collection cavity 88 is fluidly coupled to an orifice 108 of the flow regulator 90. The cavity orifice 106 and the regulator orifice 108, for example, may be formed by a common opening or port. As described below in further detail, the cavity orifice 106 may function as an inlet into the collection cavity 88 and/or an outlet from the collection cavity 88 during operation of the bleed system 78. Similarly, the regulator orifice 108 may function as an outlet from the flow regulator 90 and/or an inlet into the flow regulator 90 during operation of the bleed system 78.

The collection cavity 88 may be configured as a blind cavity. The collection cavity 88, for example, may be fluidly decoupled from (e.g., all) other volumes within the turbine engine 20 and its engine core 52 except for an internal volume 110 of the flow regulator 90. In other words, the cavity orifice 106 may be the only inlet into the collection cavity 88, and the cavity orifice 106 may also or alternatively be the only outlet from the collection cavity 88, at least during operation of the turbine engine 20 and its bleed system 78. However, it is contemplated the collection cavity 88 may also be configured with a door or a panel to provide maintenance personnel access to an interior of the collection cavity 88. It is also contemplated the collection cavity 88 may be configured with a drain for removing water from the collection cavity 88.

The collection cavity 88 of FIG. 2 includes a radial inner region 112, a radial outer region 114 and an intermediate region 116 radially between the inner region 112 and the outer region 114. The intermediate region 116 is between and fluidly couples each of the inner region 112 and the outer region 114 to the cavity orifice 106/the regulator orifice 108. The inner region 112 of FIG. 2 is disposed radially inboard of the cavity orifice 106/the regulator orifice 108. The outer region 114 of FIG. 2 is disposed radially outboard of the cavity orifice 106/the regulator orifice 108. Thus, when the collection cavity 88 is disposed vertically above (e.g., with respect to gravity) the core flowpath 64, the inner region 112 of the collection cavity 88 is operable to (e.g., temporarily) hold debris extracted from the core flowpath 64 without, for example, reintroducing that debris back into the core flowpath 64. The arrangement of the collection cavity 88 may also provide an acoustic resonator (e.g., a Helmholtz resonator) to damp acoustics in the core flowpath 64 when the flow regulator 90 is closed.

Figure 3B:
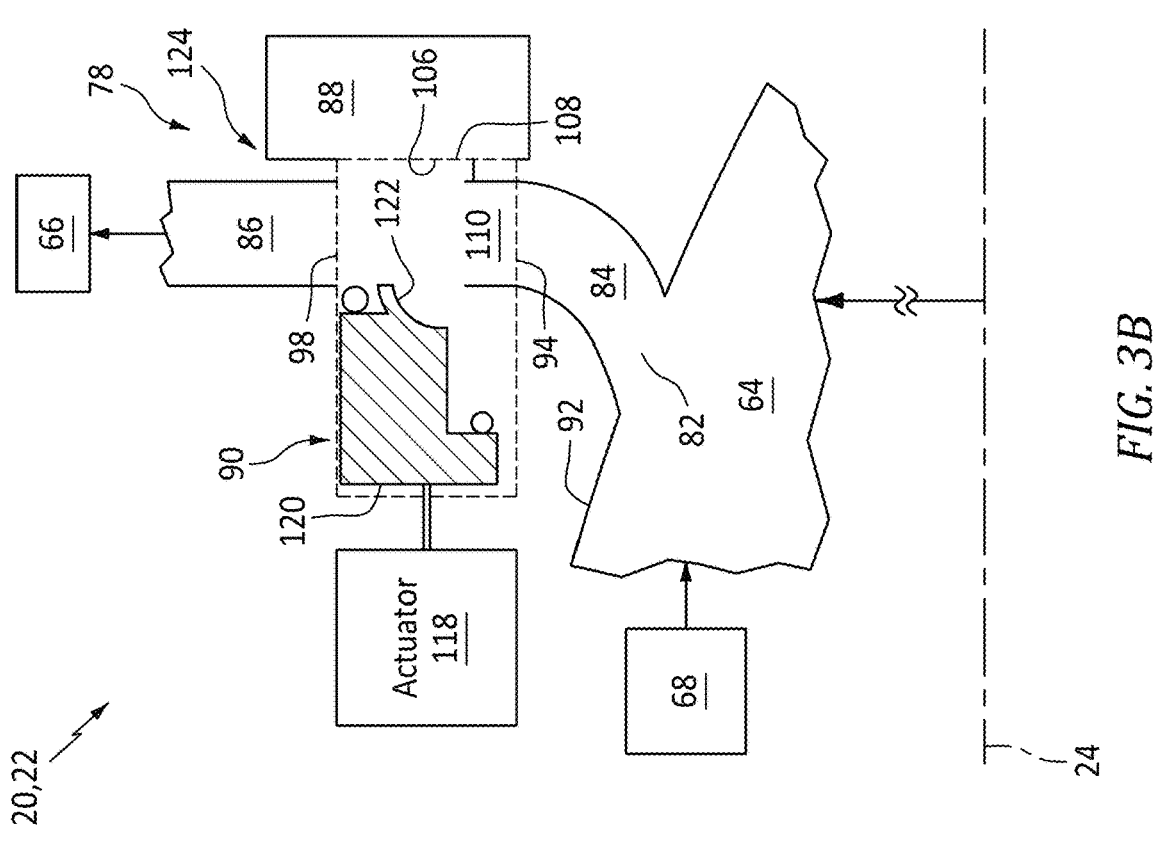
FIGS. 3A and 3B are partial schematic sectional illustrations of the propulsion system with a flow diverter of the bleed system in closed and open positions.
Figure 3A:
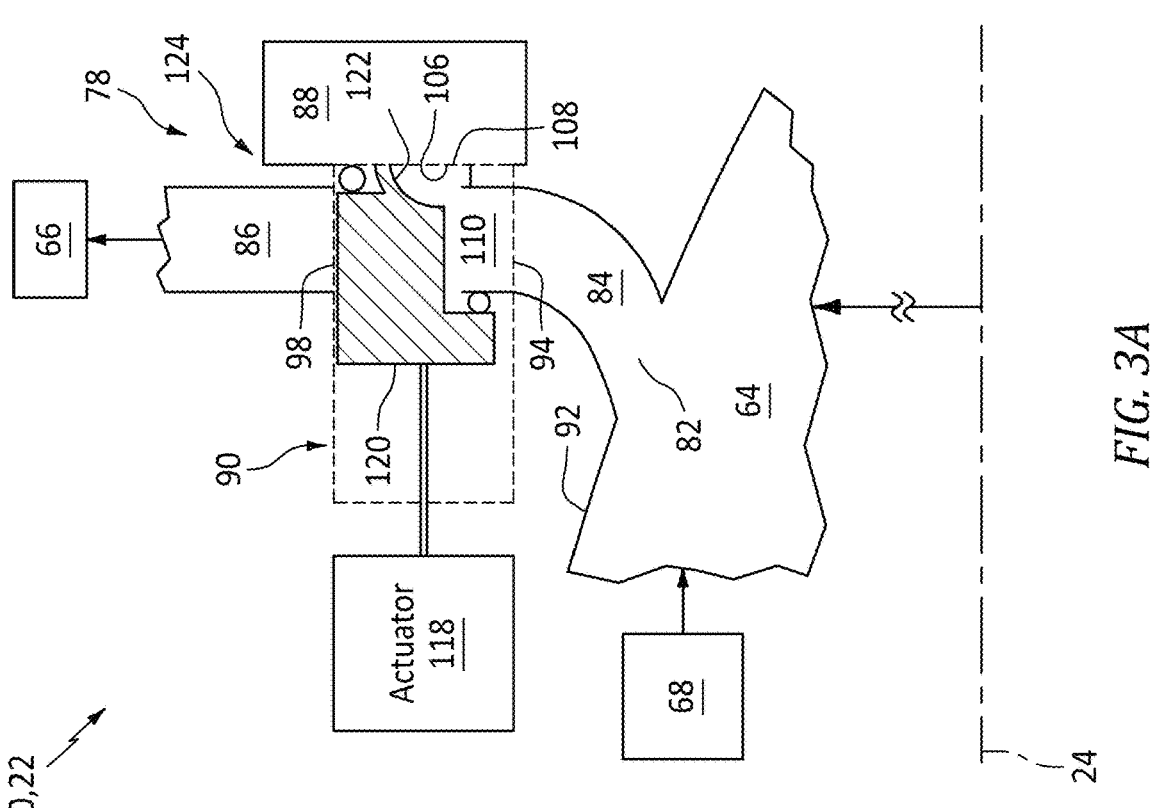

Referring to FIGS. 3A and 3B, the flow regulator 90 includes an actuator 118 and a flow diverter 120; e.g., a valve element. The actuator 118 is configured to move the flow diverter 120 between a closed position (see FIG. 3A) and an open position (see FIG. 3B). The actuator 118 of FIGS. 3A and 3B, for example, is configured to axially translate the flow diverter 120 from the closed position of FIG. 3A to the open position of FIG. 3B, and from the open position of FIG. 3B to the closed position of FIG. 3A. Examples of the actuator 118 include an electric motor, a hydraulic actuator, a pneumatic actuator, or the like. This actuator 118 may be directly coupled to the flow diverter 120, or coupled to the flow diverter 120 through an intermediate kinematic linkage.

In the closed position of FIG. 3A, the flow diverter 120 extends across the regulator volume 110 and closes off (e.g., blocks) the regulator outlet 98. The flow regulator 90 and its flow diverter 120 thereby fluidly decouple the inlet passage 84 from the outlet passage 86. By contrast, the inlet passage 84 is fluidly coupled to the collection cavity 88 through the flow regulator 90. The flow diverter 120 of FIG. 3A, for example, includes a flow guide 122 which guides matter (e.g., the debris) from the inlet passage 84 into the collection cavity 88 through the cavity orifice 106/the regulator orifice 108. In this closed position of FIG. 3A, the flow diverter 120 and its flow guide 122 form an outer peripheral boundary of the cavity orifice 106/the regulator orifice 108.

In the open position of FIG. 3B, the flow diverter 120 is partially or completely retracted out of the regulator volume 110 to open up (e.g., unblock) the regulator outlet 98. The flow regulator 90 and its flow diverter 120 thereby fluidly couple the inlet passage 84 to the outlet passage 86. The flow regulator 90 and its flow diverter 120 also fluidly couple the collection cavity 88 to the outlet passage 86. Here, the inlet passage 84 may also remain fluidly coupled to the collection cavity 88 through the flow regulator 90. In this open position of FIG. 3B, the outer peripheral boundary of the cavity orifice 106/the regulator orifice 108 is now formed by a stationary structure 124 forming a housing of the flow regulator 90 and/or a containment wall of the collection cavity 88 since the flow diverter 120 and its flow guide 122 are translated away from the collection cavity 88.

During bleed system operation, the flow regulator 90 may selectively close and open the outlet passage 86 based on one or more parameters. Examples of these parameters include, but are not limited to, engine power, environmental condition(s) in an environment external to the aircraft and its turbine engine 20, aircraft mode, etc. Examples of the aircraft mode include, but are not limited to, aircraft taxiing, aircraft takeoff, aircraft climb, aircraft cruise, aircraft descent and aircraft landing.

When the turbine engine 20 and its engine core 52 are operating at high power, the flow diverter 120 may be disposed in its closed position of FIG. 3A. With the flow diverter 120 in this closed position, little or no core air is bled out of the core flowpath 64 into the bleed system 78 and its inlet passage 84 since the inlet passage 84 is functionally dead ended by the closed regulator outlet 98 and the (e.g., blind) collection cavity 88. Additional core air is thereby available within the core flowpath 64 downstream of the bleed port 82 for engine core operation. However, under certain environmental conditions, the core air flowing towards the bleed port 82 may carry debris. This debris has a larger mass than the core air. Momentum of the debris may thereby move the debris along the outer flowpath wall 92 and into the inlet passage 84 through the bleed port 82. This debris may then be directed through the flow regulator 90 by the flow guide 122 into the collection cavity 88, where the debris may be (e.g., temporarily) collected and contained within the collection cavity 88 at least while the flow diverter 120 remains in its closed position. The core air flowing past the bleed port 82 within the core flowpath 64 may thereby be relatively clean air with little or no debris carried thereby/entrained therein. Here, the collection cavity 88 is arranged downstream of the flow regulator 90 and its flow diverter 120.

When the turbine engine 20 and its engine core 52 are operating at low power and/or the aircraft is operating in a particularly debris filled environment, the flow diverter 120 may be disposed in its open position of FIG. 3B. With the flow diverter 120 in this open position, a quantity of the core air may be bled from the core flowpath 64 through the bleed port 82 into the inlet passage 84. This bleed air may then be directed sequentially through the open flow regulator 90 and the outlet passage 86 and into the bypass flowpath 66 (or the other engine volume). Again, the momentum of the debris may move the debris along the outer flowpath wall 92 and into the inlet passage 84 through the bleed port 82 with the bleed air. However, when the flow regulator 90 is open and its flow diverter 120 is retracted in its open position, the debris may flow with the bleed air past the cavity orifice 106/the regulator orifice 108 and through the outlet passage 86 to be discharged into the bypass flowpath 66 (or the other engine volume) with the bleed air. Thus, while the cavity orifice 106/the regulator orifice 108 may remain open, the debris may substantially or completely bypass the collection cavity 88. In addition, as the bleed air flows past the cavity orifice 106/the regulator orifice 108, the flow of the bleed air may generate a vacuum (e.g., a pressure difference across the cavity orifice 106/the regulator orifice 108) which pulls out some or all of the debris which may have been previously collected and held within the collection cavity 88.

In some embodiments, referring to FIGS. 3A, 3B and FIGS. 4A-C, the collection cavity 88 may be located axially aft and/or downstream (e.g., relative to flow direction within the core flowpath 64) of the inlet passage 84. The inlet passage 84 of FIGS. 3A, 3B and FIGS. 4A-C, for example, is disposed axially along the axis 24/longitudinally along the core flowpath 64 between the core inlet 68 and the collection cavity 88. In other embodiments, referring to FIGS. 5A-7B, the collection cavity 88 may be located axially forward and/or upstream (e.g., relative to flow direction within the core flowpath 64) of the inlet passage 84. The collection cavity 88 of FIGS. 5A-7B, for example, is disposed axially along the axis 24/longitudinally along the core flowpath 64 between the core inlet 68 and the inlet passage 84.

Figure 7B:
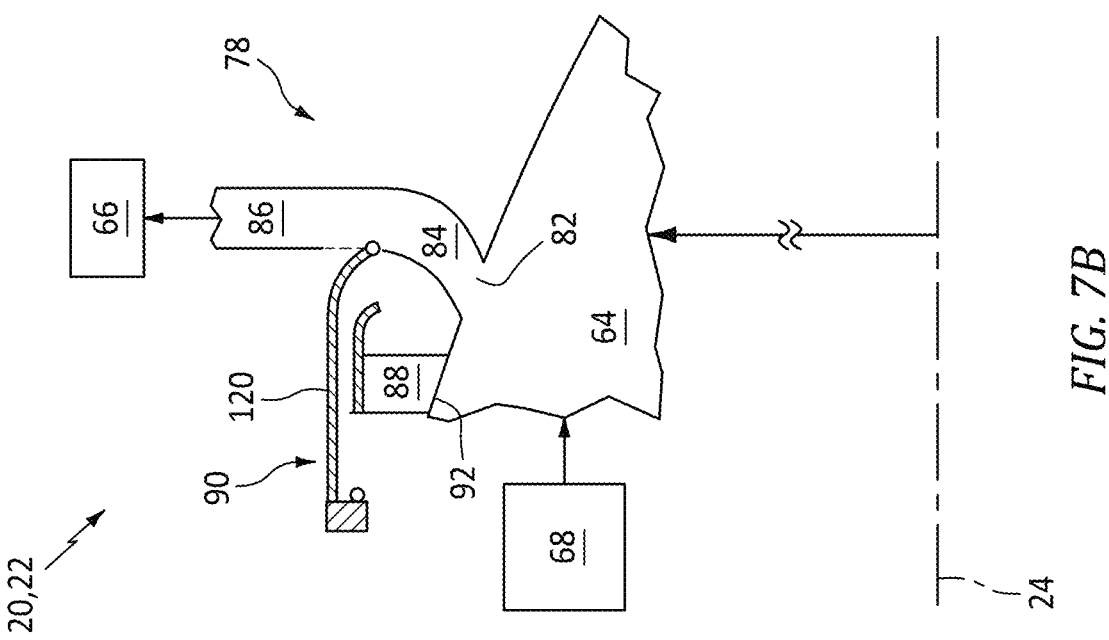
FIGS. 7A and 7B are partial schematic sectional illustrations of the propulsion system with still another flow diverter in closed and open positions.
Figure 7A:
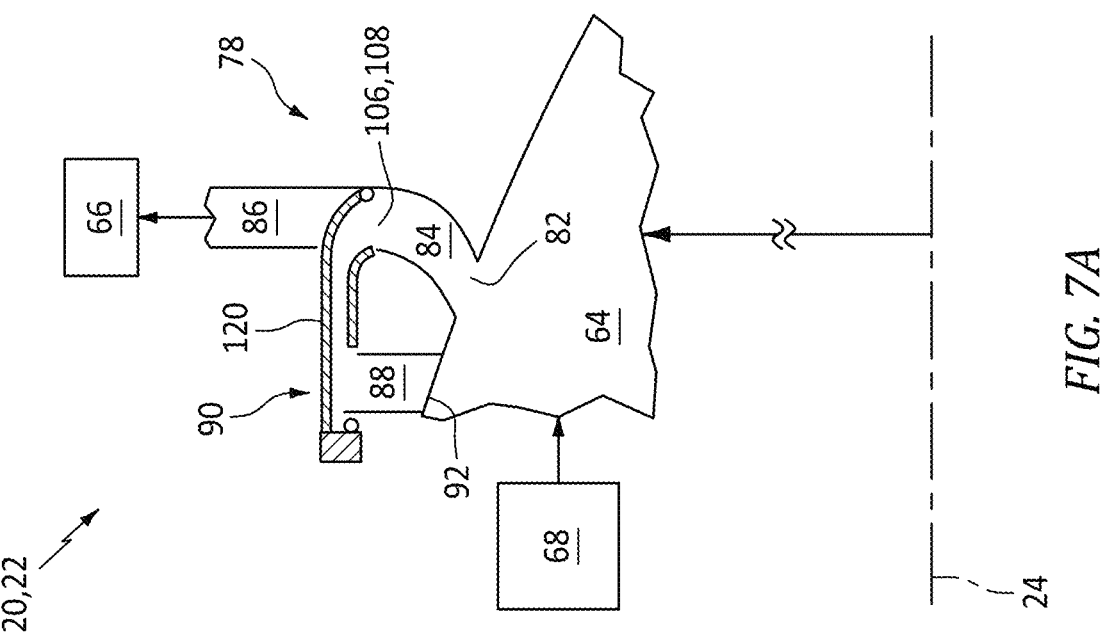

In some embodiments, referring to FIGS. 3A and 7A, the collection cavity 88 may be axially spaced from the inlet passage 84 by an intermediate structure. In other embodiments, referring to FIGS. 4A, 5A and 6A, the collection cavity 88 and the inlet passage 84 may share a common wall 126. This common wall 126 is between and partially forms the collection cavity 88 and the inlet passage 84.

Figures 4A, 4B:
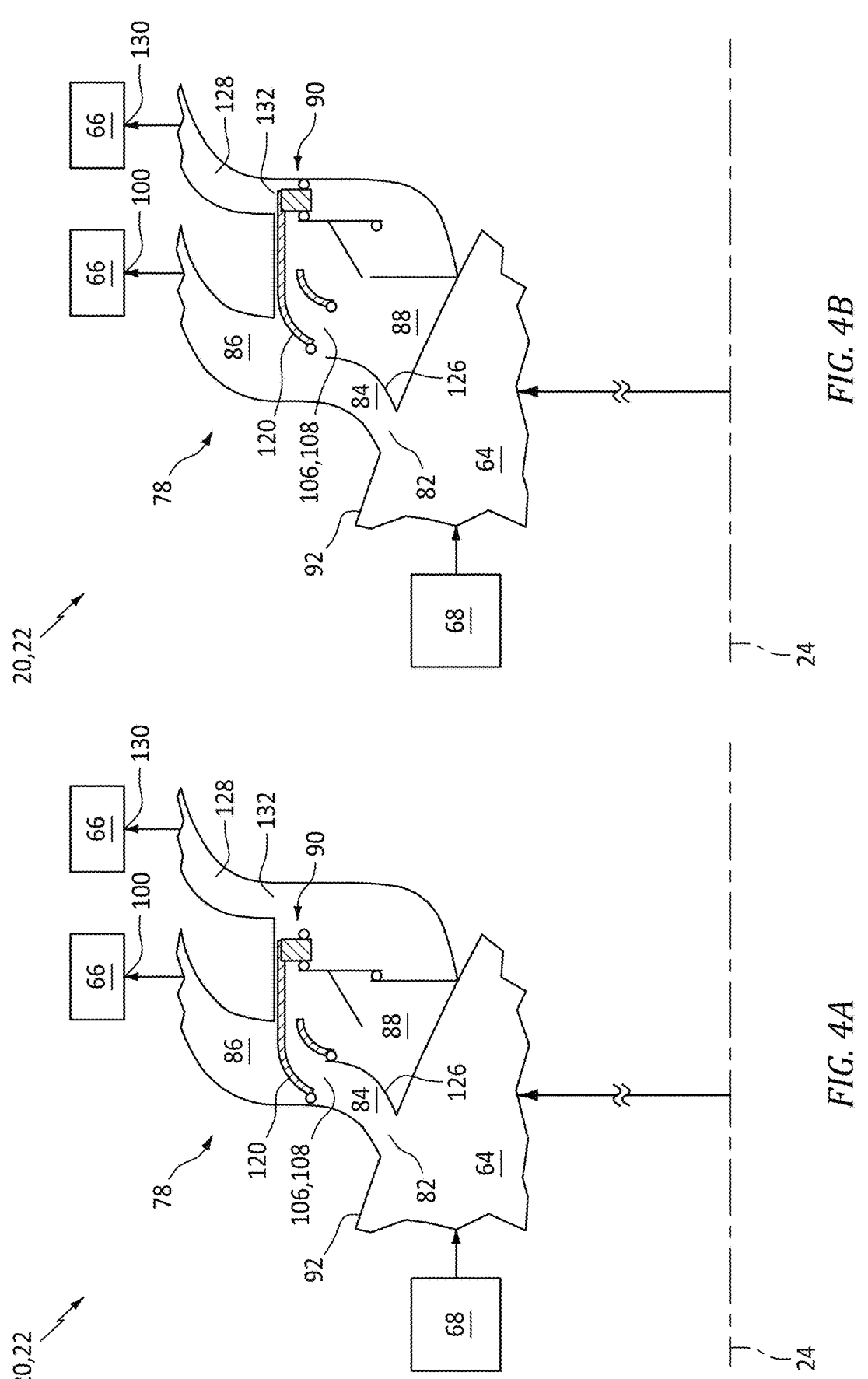
FIGS. 4A-C are partial schematic sectional illustrations of the propulsion system with another flow diverter in closed, open and intermediate positions.
Figure 5B:
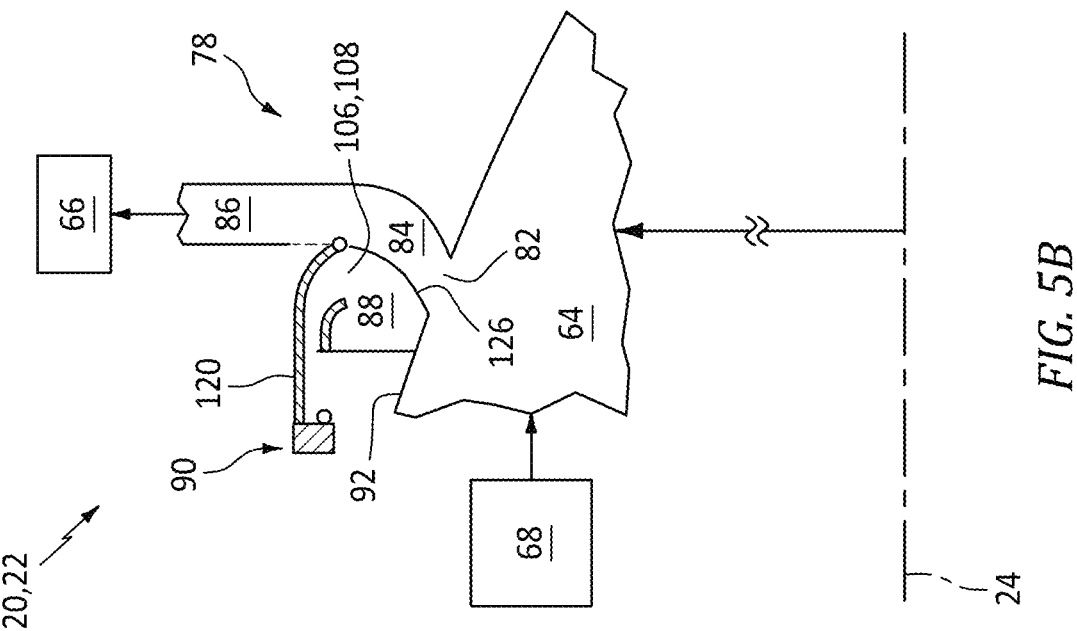
FIGS. 5A and 5B are partial schematic sectional illustrations of the propulsion system with another flow diverter in closed and open positions.
Figure 5A:
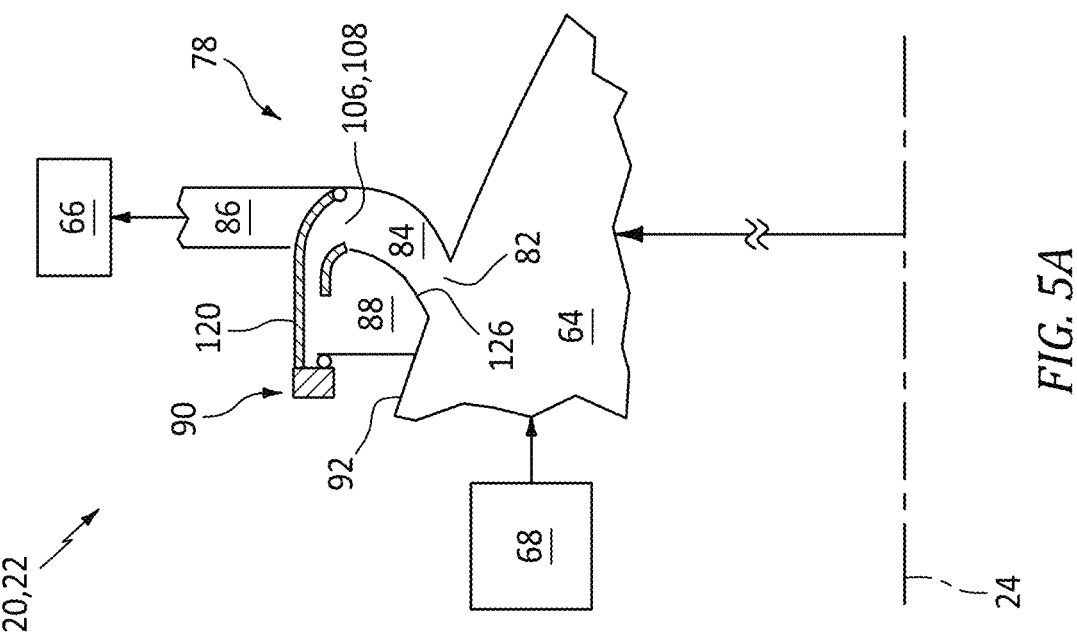
Figure 6B:
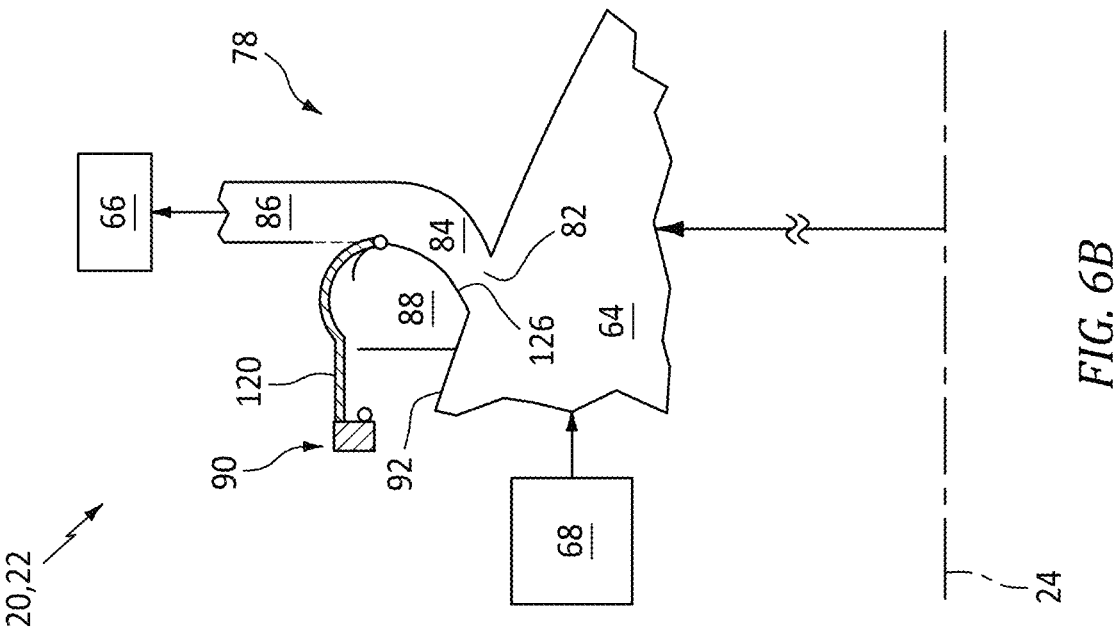
FIGS. 6A and 6B are partial schematic sectional illustrations of the propulsion system with another flow diverter in closed and open positions.
Figure 6A:
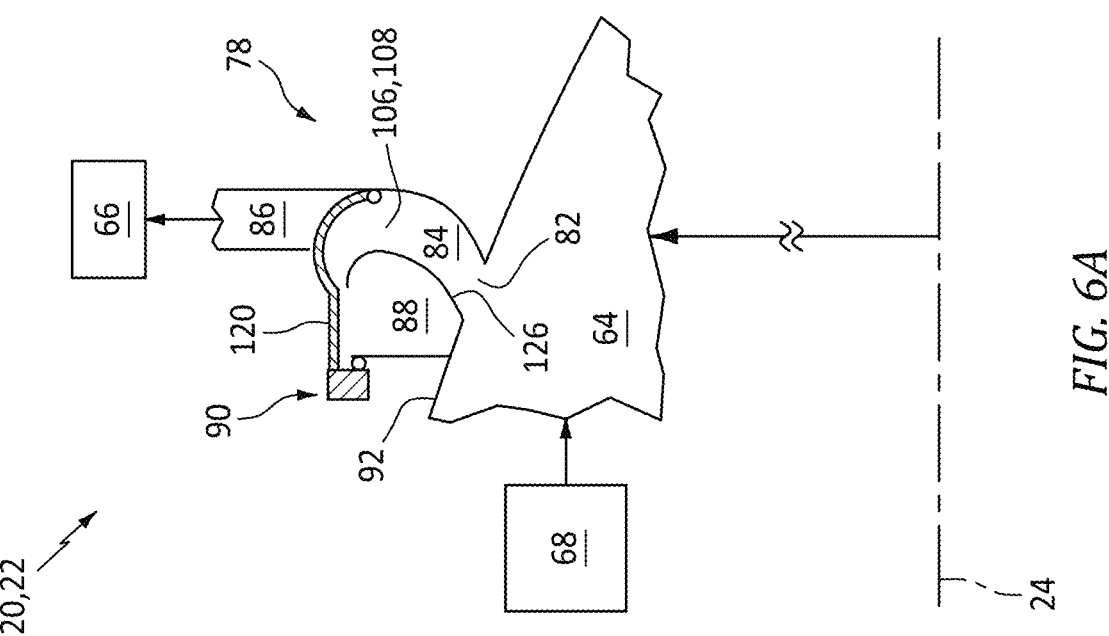

In some embodiments, referring to FIGS. 3A and 5A, the flow diverter 120 may partially form the cavity orifice 106 and/or the regulator orifice 108. The flow diverter 120 of FIGS. 3A and 5A, for example, forms the outer peripheral boundary of the cavity orifice 106 and/or the regulator orifice 108 when the flow diverter 120 is in its closed position. The stationary structure 124 forms an inner peripheral boundary of the cavity orifice 106 and/or the regulator orifice 108 when the flow diverter 120 is in its closed position. By contrast, referring to FIG. 3B for example, the stationary structure 124 may form both the outer and the inner peripheral boundaries of the cavity orifice 106 and/or the regulator orifice 108 when the flow diverter 120 is in its open position. In other embodiments, referring to FIGS. 4A, 6A and 7A, the flow diverter 120 may (e.g., completely) form the cavity orifice 106 and/or the regulator orifice 108. The flow diverter 120 of FIGS. 4A, 4B, 6A, 6B, 7A and 7B, for example, forms both the outer and the inner peripheral boundaries of the cavity orifice 106 and/or the regulator orifice 108 when the flow diverter 120 is in its closed position.

In some embodiments, referring to FIG. 3B, the collection cavity 88 may remain fluidly coupled to the inlet passage 84 when the flow diverter 120 is in its open position. In other embodiments, referring to FIGS. 4B, 5B, 6B and 7B, the flow regulator 90 and its flow diverter 120 may be configured to fluidly decouple the inlet passage 84 from the collection cavity 88 when the flow diverter 120 is in its open position. The flow diverter 120 of FIGS. 4B, 5B, 6B and 7B, for example, closes off (e.g., blocks) the cavity orifice 106 and/or the regulator orifice 108.

In some embodiments, referring to FIGS. 3A, 3B and 5A-7B, the collection cavity 88 may be configured as the blind cavity. In other embodiments, referring to FIGS. 4A-C, the bleed system 78 may include another outlet passage 128. This second outlet passage 128 projects longitudinally out from the collection cavity 88 to an outlet 130 from the second outlet passage 128. The second outlet passage outlet 130 may fluidly couple the second outlet passage 128 to the bypass flowpath 66. The second outlet passage outlet 130, for example, may be formed as an opening in the inner flowpath wall 102 along the bypass flowpath 66 (see FIG. 1). Alternatively, it is contemplated the second outlet passage outlet 130 may fluidly couple the second outlet passage 128 to another volume (e.g., flowpath, plenum, etc.) outside of the engine core 52, which other volume may be within the turbine engine 20 or outside of the turbine engine 20 and, more generally, the aircraft propulsion system 22. Here, the second outlet passage outlet 130 is downstream of the first outlet passage outlet 100 along the bypass flowpath 66. However, the present disclosure is not limited to such an exemplary arrangement.

Figure 4C:
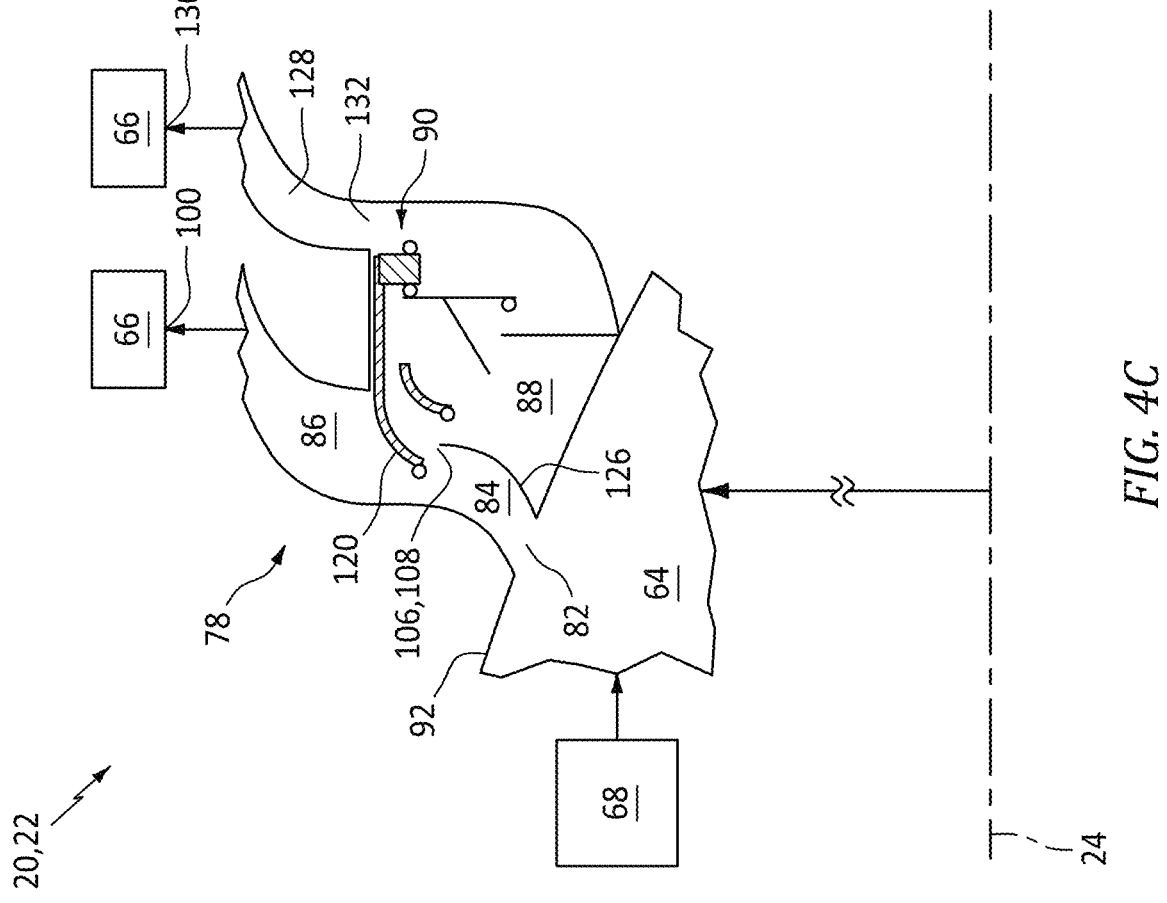

During bleed system operation, the flow diverter 120 may be selectively moved to its closed position of FIG. 4A, its open position of FIG. 4B and an intermediate position of FIG. 4C. In the closed position of FIG. 4A, the flow diverter 120 closes off access the first outlet passage 86 to fluidly decouple the inlet passage 84 form the first outlet passage 86. The flow diverter 120 also closes off access from the collection cavity 88 to the second outlet passage 128 to fluidly decouple the collection cavity 88 from the second outlet passage 128. In the open position of FIG. 4B, the flow diverter 120 opens up access the first outlet passage 86 to fluidly couple the inlet passage 84 to the first outlet passage 86. The flow diverter 120 also removes access to the cavity orifice 106 (e.g., a dedicated cavity inlet)/the regulator orifice 108 (e.g., a dedicated regulator outlet) to fluidly decouple the collection cavity 88 from the inlet passage 84. The flow diverter 120 of FIG. 4B, for example, blocks an opening 132 to the second outlet passage 128. In the intermediate position of FIG. 4C, the flow diverter 120 partially opens up/partially closes off access to the first outlet passage 86, the cavity orifice 106 and/or the regulator orifice 108. The flow regulator 90 of FIG. 4C thereby fluidly couples the inlet passage 84 to both the first outlet passage 86 and the collection cavity 88 in parallel. The flow diverter 120 of FIG. 4B, for example, unblocks the opening 132 to the second outlet passage 128. The flow regulator 90 of FIG. 4C thereby fluidly couples the collection cavity 88 to the second outlet passage 128. Thus, with the flow diverter 120 in its intermediate position of FIG. 4C (e.g., axially between its closed and open positions), (a) a first portion of the bleed air may flow through the first outlet passage 86 into the bypass flowpath 66 (or the other engine volume) while (b) a second portion of the bleed air may flow sequentially through the collection cavity 88 and the second outlet passage 128 into the bypass flowpath 66 (or the other engine volume). As this second portion of the bleed air flows through the collection cavity 88, the bleed air may also push or otherwise carry out some or all of the debris (if any) previously collected within the collection cavity 88. The intermediate position of FIG. 4C therefore may be utilized to clean out the collection cavity 88 of some or all of the debris previously collected and held therein.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly of a turbine engine, comprising:
an engine core including a core flowpath, a compressor section, a combustor section and a turbine section, the core flowpath extending through the compressor section, the combustor section and the turbine section from an inlet into the core flowpath to an exhaust from the core flowpath; and
a bleed system including a bleed port, an inlet passage, an outlet passage, a cavity and a valve element, the bleed port disposed longitudinally along the core flowpath between the inlet into the core flowpath and the exhaust from the core flowpath, the bleed port fluidly coupling the core flowpath to the inlet passage, and the valve element moves between a first position and a second position;

wherein, when the valve element is in the first position, the valve element fluidly decouples the inlet passage from the outlet passage, and the cavity is fluidly coupled with the inlet passage and is downstream of the valve element; and wherein, when the valve element is in the second position, the valve element fluidly couples the inlet passage to the outlet passage;

wherein the engine core extends along a centerline axis; and wherein the valve element moves axially along the centerline axis between the first position and the second position.

2. The assembly of claim 1, wherein the bleed port is disposed longitudinally along the core flowpath downstream of the compressor section.

3. The assembly of claim 1, wherein the bleed port is disposed longitudinally along the core flowpath within the compressor section.

4. The assembly of claim 1, wherein, when the valve element is in the second position, the cavity is fluidly coupled to at least one of the inlet passage and the outlet passage.

5. The assembly of claim 1, wherein, when the valve element is in the second position, the valve element fluidly decouples the cavity from the inlet passage.

6. The assembly of claim 1, wherein the bleed system directs debris traveling within the core flowpath through the bleed port and into the inlet passage; and the valve element directs the debris from the inlet passage into the cavity when the valve element is in the first position.

7. The assembly of claim 6, wherein the bleed system directs the debris from the inlet passage into the outlet passage when the valve element is in the second position.

8. The assembly of claim 7, wherein, when the valve element is in the second position, the bleed system directs the debris out of the engine core through the outlet passage.

9. The assembly of claim 1, wherein the turbine engine comprises a turbofan engine, and the assembly further comprises: a bypass flowpath outside of the engine core; and the outlet passage couples the inlet passage to the bypass flowpath when the valve element is in the second position.

10. The assembly of claim 1, wherein the valve element at least partially forms a cavity inlet into the cavity when the valve element is in the first position.

11. The assembly of claim 1, wherein the cavity is a blind cavity.

12. The assembly of claim 1, wherein the bleed system further includes a second outlet passage; and when the valve element is in a third position, the valve element fluidly couples the inlet passage to the cavity and fluidly couples the cavity to the second outlet passage.

13. The assembly of claim 12, wherein, when the valve element is in the third position, the valve element fluidly couples the inlet passage to the outlet passage.

14. The assembly of claim 12, wherein, when the valve element is in the first position, the valve element fluidly decouples the cavity from the second outlet passage.

15. The assembly of claim 12, wherein, when the valve element is in the second position, the valve element fluidly decouples the cavity from the second outlet passage.

16. The assembly of claim 1, the cavity is located axially along the centerline axis between the inlet into the core flowpath and the inlet passage.

17. The assembly of claim 1, the inlet passage is located axially along the centerline axis between the inlet into the core flowpath and the cavity.

18. An assembly of a turbine engine, comprising:

an engine core including a core flowpath, a compressor section, a combustor section and a turbine section, the core flowpath extending through the compressor section, the combustor section and the turbine section from an inlet into the core flowpath to an exhaust from the core flowpath; and a bleed system including a bleed port, an inlet passage, an outlet passage, a cavity and a valve element, the bleed port disposed longitudinally along the core flowpath between the inlet into the core flowpath and the exhaust from the core flowpath, the bleed port fluidly coupling the core flowpath to the inlet passage, and the valve element moves between a first position and a second position;

wherein, when the valve element, is in the first position, the valve element, fluidly decouples the inlet passage from the outlet passage, the cavity is fluidly coupled with the inlet passage through a cavity inlet, and the valve element, at least partially forms the cavity inlet; and wherein, when the valve element, is in the second position, the valve element, fluidly couples the inlet passage to the outlet passage; and wherein the cavity provides a Helmholtz resonator.

* * * * *